(12) United States Patent
Simonini (10) Patent No.: US 8,781,658 B2
(45) Date of Patent: Jul. 15, 2014

(54) SYSTEMS AND METHODS FOR DETERMINING THE TARGET THERMAL CONDITIONING VALUE TO CONTROL A RECHARGEABLE ENERGY STORAGE SYSTEM

(75) Inventor: Matthew Simonini, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 321 days.

(21) Appl. No.: 13/108,409

(22) Filed: May 16, 2011

(65) Prior Publication Data

US 2012/0109433 A1 May 3, 2012

Related U.S. Application Data (60) Provisional application No. 61/407,742, filed on Oct. 28, 2010.

(51) Int. Cl.

| | | |
|---|---|---|
| *B60L 11/00* | (2006.01) | |
| *B60W 10/24* | (2006.01) | |
| *H01M 10/50* | (2006.01) | |
| *B60L 1/00* | (2006.01) | |
| *H01M 10/48* | (2006.01) | |
| *B60L 11/14* | (2006.01) | |
| *B60L 1/02* | (2006.01) | |
| *B60L 11/18* | (2006.01) | |
| *B60W 20/00* | (2006.01) | |

(52) U.S. Cl.
CPC .............. *B60L 1/003* (2013.01); *Y02T 10/7011* (2013.01); *H01M 10/5083* (2013.01); *Y02T 10/7077* (2013.01); *Y02E 60/12* (2013.01); *Y02T 10/7005* (2013.01); *H01M 10/502* (2013.01); *B60L 2240/662* (2013.01); *B60L 2260/56* (2013.01); *H01M 10/5079* (2013.01); *B60L 2240/549* (2013.01); *H01M 10/486* (2013.01); *B60W 20/00* (2013.01); *B60L 2240/445* (2013.01); *Y02T 10/7291* (2013.01); *B60L 2250/16* (2013.01); *H01M 10/5022* (2013.01); *B60L 2240/545* (2013.01); *H01M 10/5006* (2013.01); *B60L 11/14* (2013.01); *H01M 10/5016* (2013.01); *B60L 2240/36* (2013.01); *H01M 10/48* (2013.01); *Y02T 10/705* (2013.01); *B60L 1/02* (2013.01); *H01M 10/5004* (2013.01); *Y02T 90/16* (2013.01); *B60L 11/1874* (2013.01); *B60L 11/1875* (2013.01)

USPC .... 701/22; 180/65.1; 180/65.29; 180/65.265; 180/65.275; 324/426

(58) Field of Classification Search
USPC ............... 701/22; 180/65.1, 65.21, 65.2, 68.1
See application file for complete search history.

(56) References Cited

U.S. PATENT DOCUMENTS

| | | | | |
|---|---|---|---|---|
| 5,937,664 | A * | 8/1999 | Matsuno et al. | 62/259.2 |
| 6,394,210 | B2 * | 5/2002 | Matsuda et al. | 180/68.1 |
| 6,450,275 | B1 * | 9/2002 | Gabriel et al. | 180/65.23 |
| 6,464,027 | B1 * | 10/2002 | Dage et al. | 180/65.22 |
| 6,467,286 | B2 * | 10/2002 | Hasebe et al. | 62/185 |
| 6,705,101 | B2 * | 3/2004 | Brotz et al. | 62/198 |
| 7,147,071 | B2 * | 12/2006 | Gering et al. | 237/12.3 B |

(Continued)

*Primary Examiner* — Thomas Tarcza
*Assistant Examiner* — Tyler J Lee
(74) *Attorney, Agent, or Firm* — Dinsmore & Shohl LLP (57) ABSTRACT

Systems and methods for determining the target thermal conditioning value to control a rechargeable energy storage system. Target thermal conditioning values are determined using a required thermal power value and a heat generation value in order to appropriately condition the RESS for heating and cooling.

16 Claims, 5 Drawing Sheets

(56) References Cited

U.S. PATENT DOCUMENTS

| | | | |
|---|---|---|---|
| 7,619,417 B2* | 11/2009 | Klang | 324/427 |
| 7,688,074 B2* | 3/2010 | Cox et al. | 324/426 |
| 7,841,431 B2* | 11/2010 | Zhou | 180/65.1 |
| 8,237,448 B2* | 8/2012 | Bertness | 324/426 |
| 8,306,690 B2* | 11/2012 | Bertness et al. | 701/34.4 |
| 2002/0043413 A1* | 4/2002 | Kimishima et al. | 180/68.1 |
| 2011/0120787 A1* | 5/2011 | Lee et al. | 180/65.1 |

* cited by examiner

SYSTEMS AND METHODS FOR DETERMINING THE TARGET THERMAL CONDITIONING VALUE TO CONTROL A RECHARGEABLE ENERGY STORAGE SYSTEM

CROSS REFERENCE TO RELATED APPLICATIONS

This application claims benefit to the Provisional application Ser. No. 61/407,742 filed Oct. 28, 2010, which is incorporated by reference herein in its entirety.

BACKGROUND

The present application relates generally to determining the target thermal conditioning value to control a rechargeable energy storage system (RESS), and more particularly to systems and methods determining the target thermal conditioning value using thermal power and heat generation values.

Automotive technology is rapidly expanding in the area of finding alternatives to using gasoline as the primary source of energy in vehicle propulsion systems. Many of these advances utilize either a hybrid mechanical-electrical system that recaptures some of the mechanical energy from the combustion engine as stored electrical energy, or a fully-electric propulsion system, which eliminates the need for an internal combustion engine entirely. With these advancements, the storage and management of electrical energy in vehicles has become of particular importance.

Hybrid and electric vehicles provide an alternative to conventional means of vehicular motive power by either supplementing (in the case of hybrids) or completely replacing (in the case of electric vehicles) the internal combustion engine (ICE). The hybrid variant of such alternative vehicle is known as an extended range electric vehicle (EREV). In one embodiment of the EREV, primary electric drive is achieved with a RESS that acts as a direct current (DC) voltage source to a motor, generator or transmission that in turn can be used to provide the energy needed to rotate one or more of the vehicle's wheels. Once the electrical charge from the RESS has been depleted, backup power may come from an ICE to provide auxiliary onboard electrical energy generation. One form of battery that appears to be particularly promising for RESS vehicular applications is known as a lithium-ion battery.

Because the RESS forms a significant part of the vehicle's propulsion system, it is important to monitor RESS parameters to ensure proper vehicular performance. Examples of such parameters include temperature, voltage, state of charge and so forth. Of these parameters, the temperature of the RESS is particularly important for the RESS and its energy consumption. The RESS must be kept within a temperature range so that it can effectively operate, i.e., its charge capacity and cycle life can be optimized. An optimal system needs to consider temperature for both heating and cooling. In order to drive the temperature within an optimal range, the required thermal power has to be quantified. Once the thermal power is determined, energy consumption can be changed to accommodate a heating or cooling event.

While temperature may be readily measured, it is difficult to relate such temperature to a way to drive one or more high voltage devices for RESS heating or cooling. This in turn hampers efficient operation of the RESS, as well as the ability to operate the RESS in a manner that will avoid temperature-related component failure.

Conventional systems and methods of determining thermal conditioning involve estimates, and tend to not be exact enough to determine how much thermal conditioning is needed to drive the battery for RESS heating and/or cooling. A more precise amount of thermal conditioning is needed in order to determine how much to drive high voltage devices for RESS heating or cooling.

SUMMARY

In one embodiment, a method for determining a target thermal conditioning value for a RESS for a vehicle having a coolant pump is disclosed. The method includes receiving, at a processor, electrical sensor data indicative of a current and resistance of the RESS. The method further includes determining a heat generation value using the electrical sensor data. The method also includes receiving, at the processor, pump sensor data indicative of an inlet temperature for the pump, outlet temperature for the pump, speed of the pump, and density of coolant within the pump. The method yet further includes determining a mass flow rate and coolant specific heat using the pump sensor data. The method also includes receiving, at the processor, ambient temperature data. The method further includes determining a target temperature for the inlet of the pump using the timestamp data, ambient temperature and a vehicle mode parameter. The method also includes receiving, at a processor, temperature sensor data indicative of a measured outlet coolant temperature. The method additionally includes calculating a required thermal power value using the target temperature, mass flow rate, coolant specific heat and the measured outlet coolant temperature. The method also includes determining a target thermal conditioning value for the RESS using the required thermal power value and the heat generation value.

In another embodiment, a system for determining a target thermal conditioning value for a RESS for a vehicle having a coolant pump is disclosed. The system includes an interface configured to receive electrical sensor data from a current sensor and a resistance sensor connected to the RESS. The system further includes a heat generation calculator configured to calculate a heat generation value using a power-based strategy on the electrical sensor data. The system also includes an interface configured to receive pump sensor data from an inlet temperature for the pump, outlet temperature for the pump, speed of the pump and density of coolant within the pump. The system yet further includes a coolant-based engine configured to determine a mass flow rate and coolant specific heat using the pump sensor data. The system also includes an interface configured to receive ambient temperature data from an external sensor to the RESS. The system further includes a temperature-based device configured to determine a target temperature for the inlet of the pump using a temperature-based strategy on the external sensor data. The system also includes an interface configured to receive a measured outlet coolant temperature from a temperature sensor. The system additionally includes a thermal power evaluator configured to calculate the required thermal power value using the target temperature, the mass flow rate and the coolant specific heat. The system also includes a target thermal conditioning evaluator configured to determine a target thermal conditioning value from the required thermal power value and the heat generation value.

In another embodiment, a system for controlling a RESS for a vehicle having a coolant pump is disclosed. The system includes a current sensor configured to measure a current of the RESS, a resistance sensor configured to measure a resistance of the RESS, a pump sensor configured to measure an inlet temperature for the pump, outlet temperature for the pump, speed of the pump, and density of coolant within the pump, an external sensor to the RESS configured to measure ambient temperature data, timestamp data, and a vehicle mode parameter, and a temperature sensor configured to measure an outlet coolant temperature. The system also includes a processor coupled to a memory and configured to receive electrical sensor data indicative of a current and resistance of the RESS. The processor is also configured to determine a heat generation value using the electrical sensor data and to receive pump sensor data indicative of an inlet temperature for the pump, outlet temperature for the pump, speed of the pump, and density of coolant within the pump. The processor is further configured to determine a mass flow rate and coolant specific heat using the pump sensor data and to receive ambient temperature data. The processor is additionally configured to determine a target temperature for the inlet of the pump using the ambient temperature, timestamp data, and a vehicle mode parameter and to receive temperature sensor data indicative of the measured outlet coolant temperature. The processor is further configured to calculate a required thermal power value using the target temperature, mass flow rate, coolant specific heat, and the measured outlet coolant temperature. The processor is also configured to determine a target thermal conditioning value for the RESS based on the required thermal power value and the heat generation value. Finally, the processor is configured to control the RESS using the target thermal conditioning value.

BRIEF DESCRIPTION OF THE DRAWINGS

The present disclosure will become more fully understood from the following detailed description, taken in conjunction with the accompanying figures, wherein like reference numerals refer to like elements, in which.

DETAILED DESCRIPTION

Before turning to the figures, which illustrate several embodiments in detail, it should be understood that the application is not limited to the details or methodology set forth in the description or illustrated in the figures. It should also be understood that the terminology is for the purpose of description only and should not be regarded as limiting.

Figure 1:
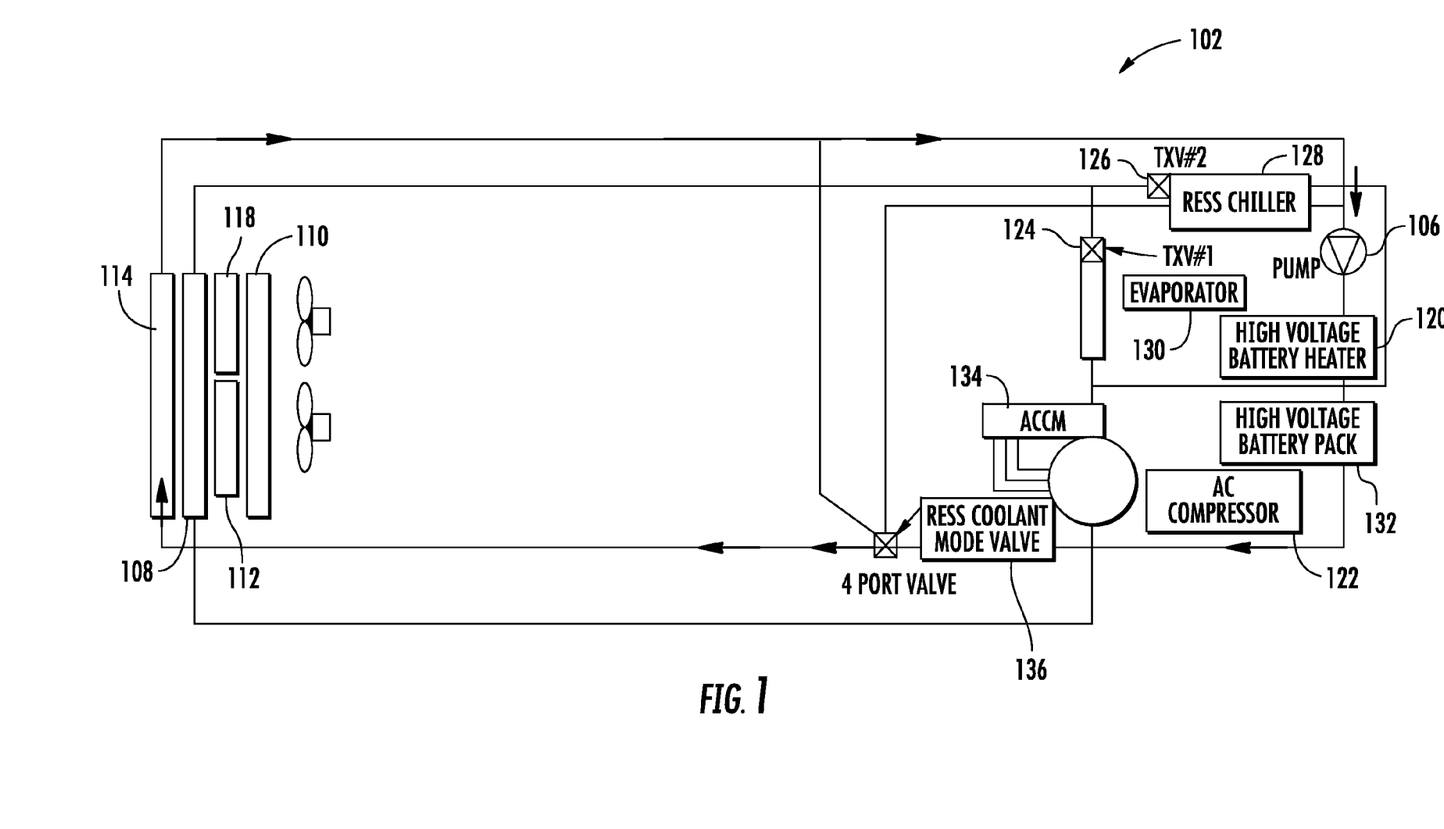
FIG. 1 shows a detailed diagram of the RESS thermal hardware schematic.

Referring now to FIG. 1, the thermal hardware schematic of the RESS 102 is shown, according to an embodiment. The RESS may include an air conditioning condenser 108, a power electronics radiator 118, a RESS radiator 114, an internal combustion engine (ICE) radiator 110, and a transmission oil radiator 112. The RESS may include a segment having an evaporator 130, which may be located in the passenger compartment of a vehicle, and other system components that may be located in an engine compartment of the vehicle. The other system components may include a thermal expansion valve (TXV #1) 124 for controlling the flow of coolant through the evaporator 130 or a chiller thermal expansion valve (TXV #2) 126 for controlling the flow of coolant through a RESS chiller 128. Coolant flowing through these valves 124, 126 from the evaporator 130 and the RESS chiller 128 is directed to an air conditioning compressor 122 and then onto the condenser 108. The air conditioning compressor 122 may further include an A/C control module 134 for additional control and cooling.

The RESS may further include a coolant pump 106 and a high voltage battery heater 120. The coolant pump 106 may pump the coolant from a high voltage battery heater 120, to the battery, where the coolant flows through to absorb heat from the high voltage battery pack 132 and, ultimately, to heat the RESS. The coolant pump 106 may pump the coolant from the high voltage battery pack 132 toward a RESS four-port valve 136. The four-port valve 136 may direct the coolant back to the chiller 128. The four-port valve 136 may also direct the coolant to the RESS radiator 114 and then back to the high voltage battery pack 132 via the pump 106. The four-port valve 136 may also direct the coolant back to the coolant pump 106 and then to the high voltage battery pack 132. In effect, the three branches of the four-port valve may direct the coolant through the pump 106, through the RESS chiller 128, or through the RESS radiator 114. The RESS may also include various sensors for detecting temperature, resistance, current and other parameters at certain points within the system.

Figure 2:
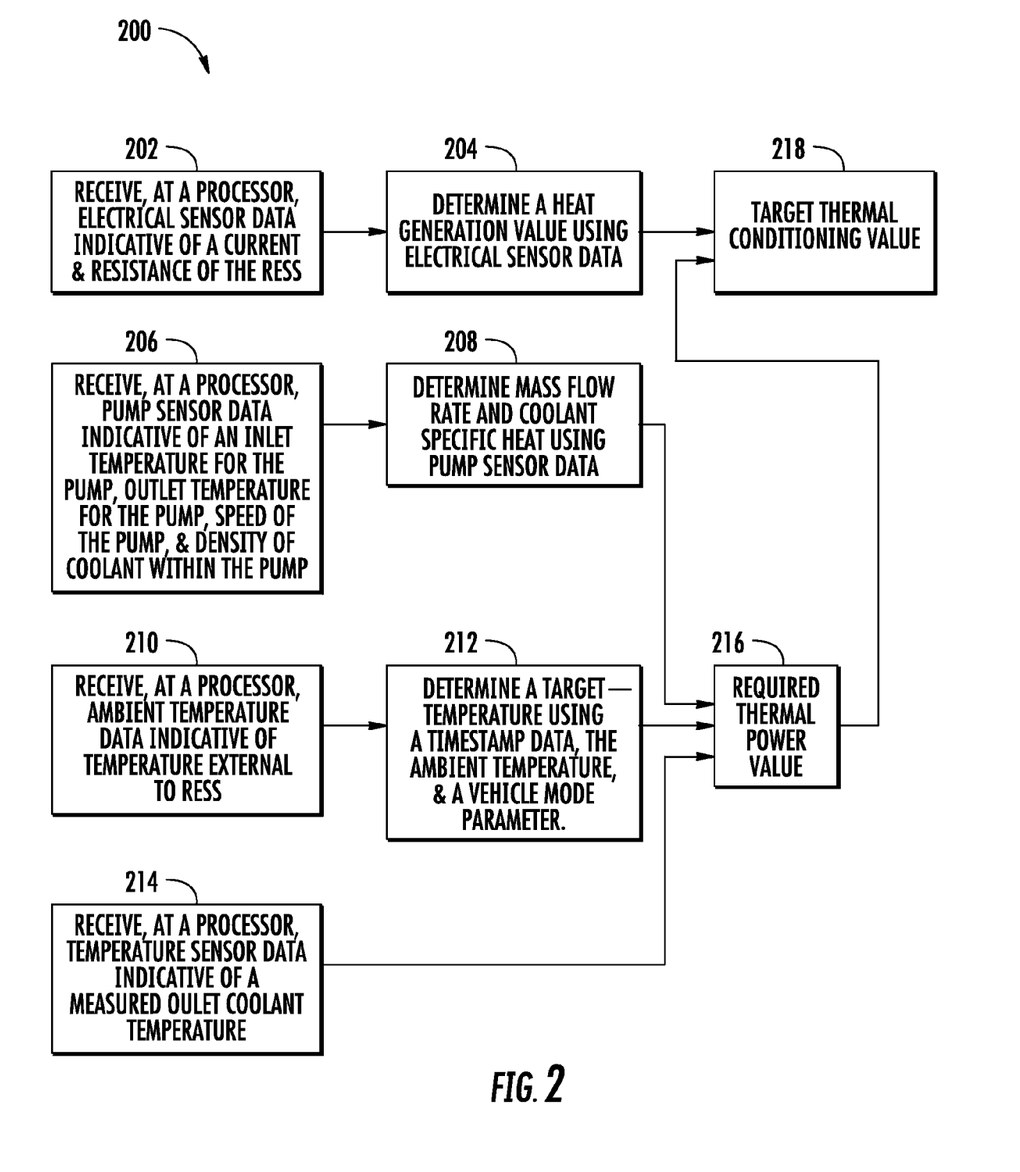
FIG. 2 shows a method for determining a target thermal conditioning value for a RESS, according to an aspect of the present disclosure.

Referring to FIG. 2, method 200 for determining a target thermal conditioning value for a RESS is shown, according to an aspect of the present disclosure. Method 200 is shown to include step 202, where electrical sensor data indicative of a current and resistance of the RESS is received at a processor. Resistance may also be stored within a memory of the processor or within a look-up table. At step 204, a heat generation value is determined using the electrical sensor data. The RESS will generate heat from electrical losses, which must be measured in order to determine the target thermal conditioning value. For example, the heat generation value can be calculated as follows:

$$Q_{ress} = I^2 * R$$

Where I is the current of the RESS and R is the resistance of the RESS. In another embodiment, the heat generation value may be passed through a filter to smooth to account for any noise or pulses.

At step 206, pump sensor data indicative of an inlet temperature for the pump, outlet temperature for the pump, speed of the pump and density coolant within the pump are received at a processor. The temperature sensors may also be located within a coolant pathway at the entrance and exit of the RESS. The mass flow rate and coolant specific heat are determined using the pump sensor data at step 208. The mass flow rate and coolant specific heat may be stored within a memory of the processor or a look-up table. Other strategies may be used to determine these parameters.

At step 210, ambient temperature data indicative of a temperature external to the RESS is received at a processor. At step 212, the target temperature for the inlet of the pump is determined using timestamp data, the ambient temperature and a vehicle mode parameter. The timestamp data and the vehicle mode parameter may be stored within a memory of the processor or obtained from various components within the RESS or in communication with the RESS. The target temperature may be determined using a look-up table. Furthermore, the vehicle mode parameter may include information whether the vehicle is on/off, the battery is charging/discharging, the engine is idling/revving, and so forth. Timestamp data may indicate the time of day, the time of year, or other information relevant to the target temperature of the inlet of the pump.

At step 214, the temperature sensor data indicative of a measured outlet coolant temperature is received at a processor. The measured outlet coolant temperature for the pump may also be determined by a signal, an external sensor, a look-up table, or it may be stored within the memory of the processor. Additionally, the temperature sensor may be placed at the outlet of the battery.

At step 216, the required thermal power value is calculated using the target temperature for the inlet of the pump, the mass flow rate, coolant specific heat, and the measured outlet coolant temperature. For example, the required thermal power value can be calculated as follows:

$$Q_{req} = m^* c^* \Delta T$$

Where $Q_{req}$ is the required thermal power value, m is mass flow rate, c is the coolant specific heat, and $\Delta T$ is the difference between the target temperature for the inlet of the pump and the measured outlet coolant temperature for the pump.

At step 218, the target thermal conditioning value is determined for the RESS using the required thermal power value and the heat generation value. For example, the target thermal conditioning value can be calculated as follows:

$$Q = Q_{req} + Q_{ress}$$

Figure 3:
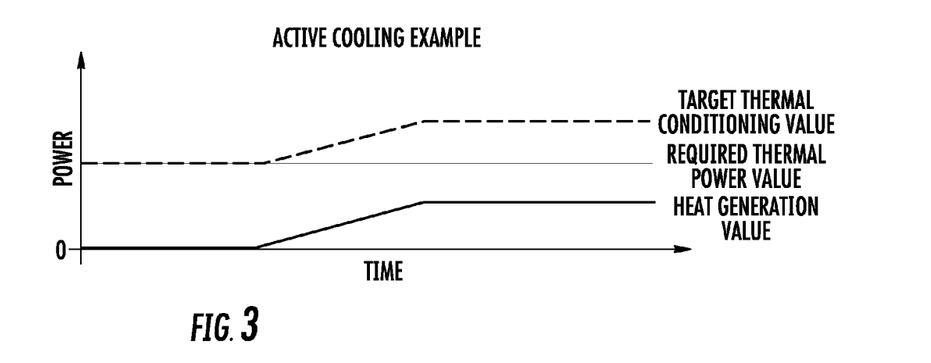
FIG. 3 is an example of the target thermal conditioning value for cooling of a RESS determined by the method of FIG. 2.

For example, this equation shows the target thermal conditioning value being determined from the accumulation of the thermal power value and the heat generation value. This adjusts the power demand to the high voltage devices to ensure that the RESS is appropriately conditioned. For example, FIG. 3 shows a target thermal conditioning value for cooling of the RESS, using the above method and the above equation. The example shows that as heat is generated in the RESS (thermal losses), the target thermal conditioning value also increases to compensate. This signal is then sent to the air conditioning compressor 122 of the RESS in order to cool the RESS.

The target thermal conditioning value can also be calculated as follows:

$$Q = Q_{req} - Q_{ress}$$

Figure 4:
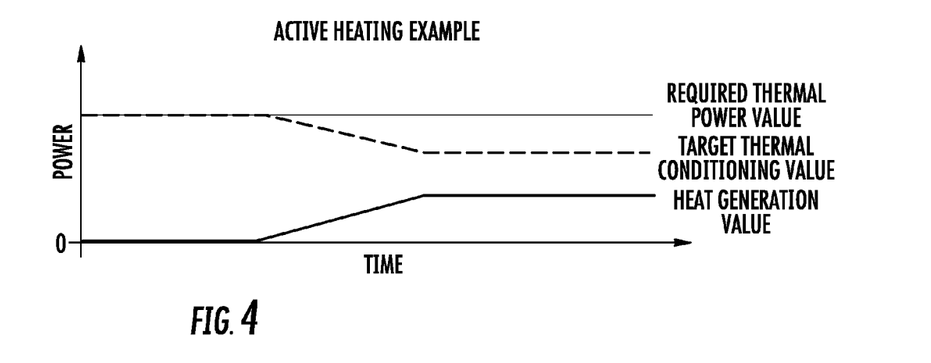
FIG. 4 is an example of the target thermal conditioning value for heating of a RESS determined by the method of FIG. 2.

For example, this equation shows the target thermal conditioning value being determined from the difference between the required thermal power value and the heat generation value. This adjusts the power demand to the high voltage devices to ensure that the RESS is appropriately conditioned, i.e., the target thermal conditioning value is equivalent to a commanded power to drive the high voltage accessories. For example, FIG. 4 shows a target thermal conditioning value for heating of the RESS, using the above method and the above equation. The example shows that as heat is generated in the RESS (thermal losses), the target thermal conditioning value decreases to compensate. This value is then sent to the high voltage battery heater of the RESS in order to decrease the work done by the heater by using the internal heat generation of the RESS, effectively to control the high voltage battery heater 120 and heat the RESS. Finally, the target thermal conditioning value may be used for feed forward control of the RESS, i.e., the cooling and heating are not dependent on the output of the system.

Figure 5:
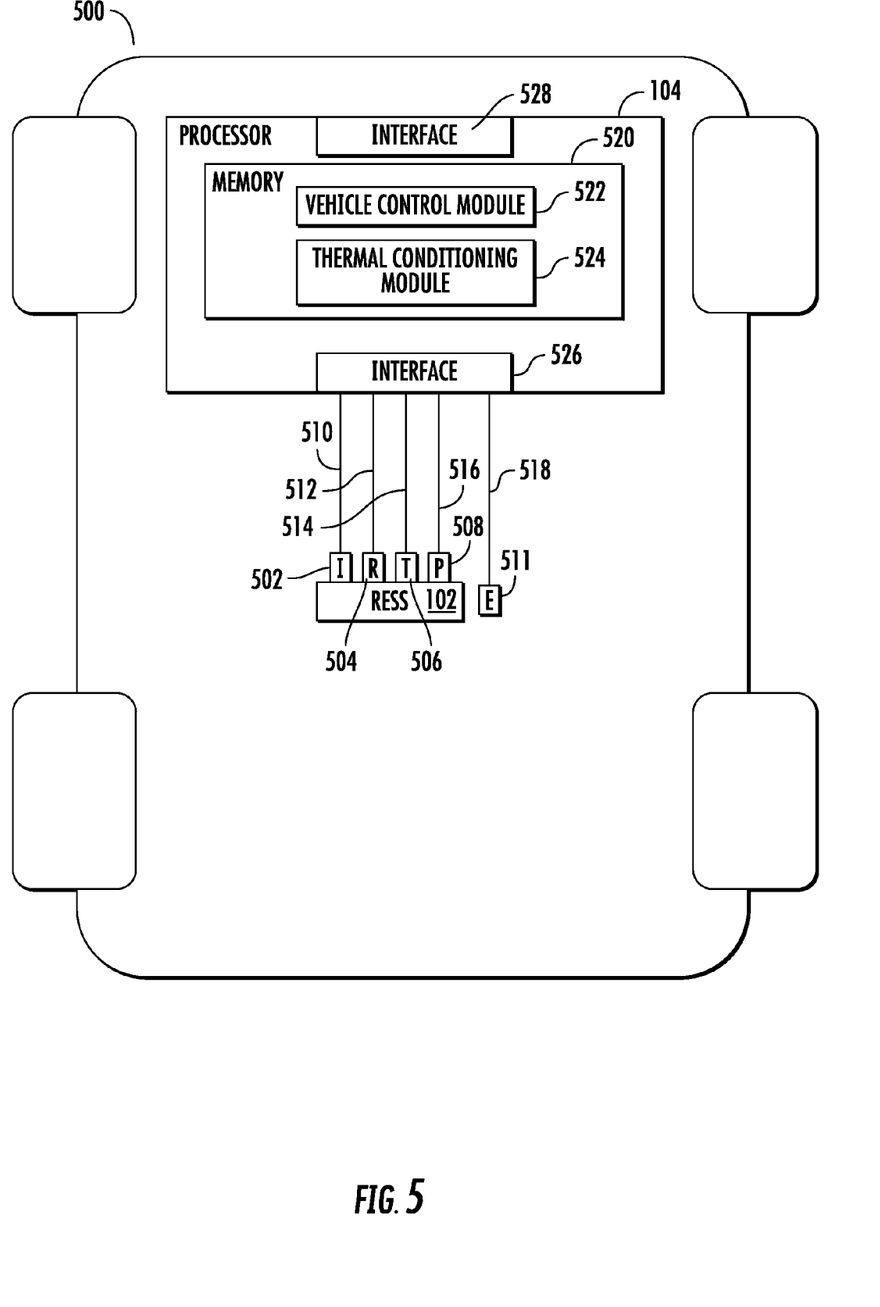
FIG. 5 shows a simplified vehicle employing a RESS thermal conditioning system according to an aspect of the present disclosure.

Referring now to FIG. 5, a detailed diagram of vehicle 500 is shown, according to an aspect of the present disclosure. Referring to FIG. 1, vehicle 500 is shown, according to an aspect of the present disclosure. Vehicle 500 includes a RESS 102, which stores electrical power to propel vehicle 500 using either a hybrid-electric or a fully-electric propulsion system. RESS 102 may include a single battery cell, multiple battery cells, or a collection of discrete batteries working in conjunction to provide propulsion power to vehicle 500.

Vehicle 500 also includes vehicle controller 104. Vehicle controller 104 is operatively connected to a RESS 102 and provides monitoring and control over the operation of the RESS 102. Vehicle controller 104 may also monitor or control one or more other functions of the vehicle. For example, vehicle controller 104 may provide information about the operational state of the RESS 102 to an electronic display within vehicle 500 to convey the information to the vehicle's driver. Vehicle controller 104 may also provide control over other systems of vehicle 500. For example, vehicle controller 104 may control the operations of the battery, the engine, the electrical system, or the exhaust system of vehicle 500.

Vehicle controller 104 may include any number of hardware and software components. For example, vehicle controller 104 may include a microprocessor, an application-specific integrated circuit (ASIC), or a field-programmable gate array (FPGA). Vehicle controller 104 may also include machine instructions stored within a memory device in vehicle controller 104 which are capable of implementing one or more monitoring or control functions when executed by vehicle controller 104. For example, vehicle controller 104 may include one or more non-transitory memory devices such as a RAM, ROM, EEPROM, flash memory, or any other memory capable of storing the machine instructions for vehicle controller 104.

Current sensor 502 measures the current of the RESS 102 and provides current values to interface 526 of controller 104 via bus line 510. Resistance sensor 504 measures the resistance of the RESS 102 and provides resistance values to interface 526 of controller 104 via bus line 512. In an alternative embodiment, the resistance may be stored in the memory of a processor or a look-up table. Temperature sensor 506 measures the outlet coolant temperature of the RESS 102 and provides temperature values to interface 526 of controller 104 via bus line 514. Pump sensor 508 measures the inlet temperature for the pump, the outlet temperature of the pump, speed of the pump, and density of coolant within the pump. The pump sensor provides these values to interface 526 of controller 104 via bus line 516. Finally, an external sensor 511 to the RESS measures ambient temperature data, timestamp data and a vehicle mode parameter. The external sensor 511 provides these values to interface 526 of controller 104 via bus line 518.

Bus lines 510, 512, and 514 may be any combination of hardwired or wireless connections. For example, bus line 510 may be a hardwired connection to provide voltage readings to controller 104, while bus line 512 may be a wireless connection to provide current readings to controller 104. In some embodiments, bus lines 510, 512, and 514 are part of a shared data line that conveys voltage, current, pump, and temperature values to controller 104. In yet other embodiments, lines 510, 512, 514, 516, and 518 may include one or more intermediary circuits (e.g., other microcontrollers, signal filters, or the like) and provide an indirect connection between sensors 502, 504, 506, 508, and 511 and controller 104.

Interface 526 is configured to receive the sensor data from sensors 502, 504, 506, 508, 511 via lines 510, 512, 514, 516, and 518. For example, interface 526 may include one or more wireless receivers, if any of lines 510, 512, 514, 516, and 518 are wireless connections. Interface 526 may also include one or more wired ports, if any of lines 510, 512, 514, 516, 518 are wired connections. Interface 526 may also include circuitry configured to digitally sample or filter the sensor data from 502, 504, 506, 508 and 511.

Controller 104 is shown to include memory 520, which may be any form of non-transitory memory capable of storing machine-executable instructions that implement one or more of the functions disclosed herein, when executed by processor 104. For example, memory 520 may be a RAM, ROM, flash memory, hard drive, EEPROM, or any other memory device. In some embodiments, memory 520 includes vehicle control module 522, which provides control over one or more components of vehicle 500. For example, vehicle control module 522 may provide control over the engine of vehicle 500 or provide status condition information (e.g., vehicle 500 is low on fuel, vehicle 500 has an estimated number of miles left to travel, amount of coolant level, or the like) to one or more display devices in the interior of vehicle 500 via interface 528. In some embodiments, vehicle control module 522 may also communicate with other processing circuits (e.g., an engine control unit, an on-board diagnostics system, or the like) or other sensors (e.g., a mass airflow sensor, a crankshaft position sensor, or the like) via interface 528.

Interface 528 may provide one or more wired or wireless connections between processor 104 and the various systems of vehicle 500. For example, interface 528 may provide a wired connection between processor 104 and a dashboard display and a wireless connection between processor 104 and an on-board diagnostics system. In some embodiments, interface 528 may also provide a wireless connection between processor 104 and other computing systems external to vehicle 500. For example, processor 104 may communicate status condition information to an external server via cellular, WiFi, or satellite connection. Interface 528 may also include one or more receivers configured to send and receive location information for vehicle 500. For example, interface 528 may include a GPS receiver or cellular receiver that utilizes triangulation to determine the location of vehicle 500.

Memory 520 is further shown to include thermal conditioning module 524, which is configured to determine and store the target thermal conditioning value for RESS 102. Thermal conditioning module 524 receives electrical sensor data from interface 526 and utilizes the sensor data to determine the present thermal conditioning value for the RESS 102. Thermal conditioning module 524 may receive and provide the determined target thermal conditioning value to vehicle control module 522 or to other electronic devices via interface 518. For example, thermal conditioning module 524 may determine the target thermal conditioning value and provide an indication of this to a charge gauge in the interior of vehicle 500 via interface 518. The thermal conditioning module 524 may also receive one or more operating parameters via interface 518 from other systems or devices.

Figure 6:
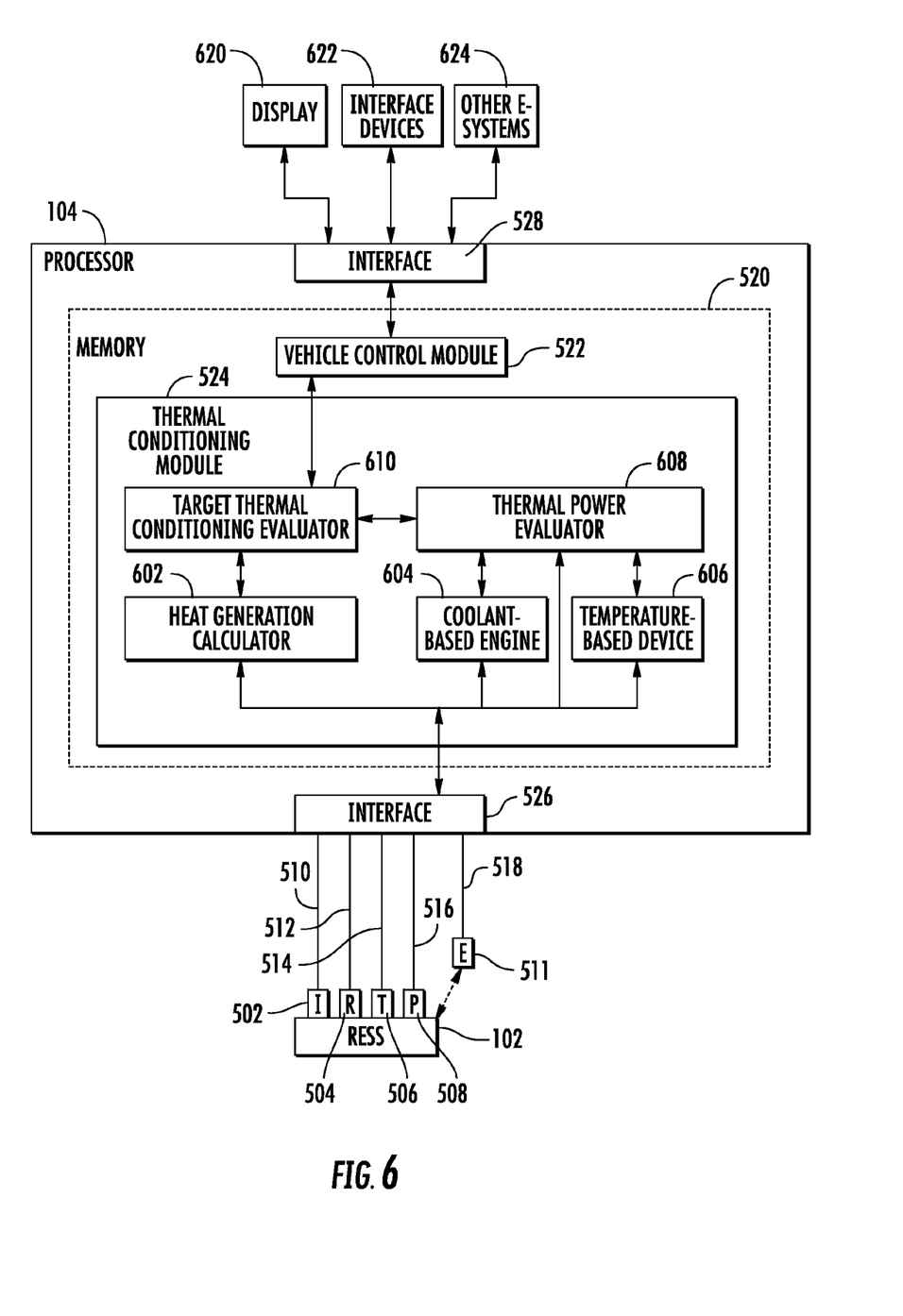
FIG. 6 is a detailed diagram of the thermal conditioning module shown in FIG. 5.

Referring now to FIG. 6, a detailed diagram of the thermal conditioning module 524 is shown, according to an aspect of the present disclosure. The thermal conditioning module 524 is shown to include a heat generation calculator 602, which receives electrical sensor data from sensors 502 and 504 via interface 526. The heat generation calculator 602 uses the sensor data to calculate a heat generation value using a power-based strategy on the sensor data. The heat generation calculator 602 provides a heat generation value to the target thermal conditioning evaluator 610, which is used to determine the target thermal conditioning value.

The thermal conditioning module 524 is also shown to include a coolant-based engine 604 and a temperature-based device 606. The coolant-based engine 604 receives sensor data from the pump sensor 508 via interface 526. The coolant-based engine 604 uses the sensor data to determine the mass flow rate and the coolant specific heat. The mass flow rate and the coolant specific heat can be found through calculation, look-up table, or detection. The coolant-based engine 604 may be a sensor, detector, timer, or any other device that has the ability to use the pump sensor data. The temperature-based device 606 receives ambient temperature data from the external sensor 511 via interface 526. The temperature-based device 606 uses the sensor data to determine a target temperature for the inlet of the pump using a temperature-based strategy on the external sensor data.

The thermal conditioning module 524 is also shown to include a thermal power evaluator 608, which receives the mass flow rate and the coolant specific heat values generated by the coolant-based engine 604 and the target temperature value generated by the temperature-based device 606. The thermal power evaluator 608 also receives a measured outlet coolant temperature from the temperature sensor 506 of the RESS via interface 526. The thermal power evaluator 608 is configured to calculate the required thermal power value using the target temperature for the inlet of the pump, the mass flow rate, the coolant specific heat and the measured outlet coolant temperature. The thermal power evaluator 608 provides an indication of the thermal power value to the target thermal conditioning evaluator 610, which is used by the target thermal conditioning evaluator 610 to determine the target thermal conditioning value from the thermal power evaluator 608 and the heat generation calculator 602.

The target thermal conditioning evaluator 610 uses the required thermal power value generated from the thermal power evaluator 608 and the heat generation value calculated from the heat generation calculator 602 to determine the target thermal conditioning value for the RESS. The target thermal conditioning evaluator 610 may provide the overall conditioning value to vehicle control module 522, or to display 620, interface devices 622, or other electronic systems 624 via interface 528. For example, target thermal conditioning evaluator 610 may provide the overall conditioning value to display 620, which may in turn display this value or another related value to the driver of vehicle 500 using visual indicia such as a meter, a gauge, or as text. The target thermal conditioning evaluator 610 may also provide the conditioning value to interface devices 622 (e.g., touch screen devices, voice interactive systems, or the like) to alert the driver of the current state of the RESS 102. The target thermal conditioning evaluator 610 may also provide the conditioning value to vehicle control module 522 or to other electronic systems 624 (e.g., a mobile device, a remote server, a microprocessor providing control over other components of vehicle 500, or the like) for further processing.

Many modifications and variations of embodiments of the present invention are possible in light of the above description. The above-described embodiments of the various systems and methods may be used alone or in any combination thereof without departing from the scope of the invention. Although the description and figures may show a specific ordering of steps, it is to be understood that different orderings of the steps are also contemplated in the present disclosure. Likewise, one or more steps may be performed concurrently or partially concurrently.

The various operations of the methods and systems in the present disclosure may be accomplished using one or more processing circuits. For example a processing circuit may be an ASIC, a specific-use processor, or any existing computer processor. One or more steps or functions in the present disclosure may also be accomplished using non-transitory, machine-readable instructions and data structures stored on machine-readable media. For example, such media may comprise a floppy disc, CD-ROM, DVD-ROM, RAM, EEPROM, flash memory, or any other medium capable of storing the machine-executable instructions and data structures and capable of being accessed by a computer or other electronic device having a processing circuit.

While the present disclosure has been particularly shown and described with reference to specific embodiments, it should be understood by those skilled in the art that various changes in form and detail may be made therein without departing from the spirit and scope of the disclosure as defined by the appended claims.

What is claimed is:

1. A method for controlling the thermal conditioning of a rechargeable energy storage system (RESS), the method comprising:
    configuring a controller with a processor and memory to receive electrical sensor data, pump sensor data, ambient temperature data, and temperature sensor data;
    providing to the processor, electrical sensor data indicative of a current and resistance of the RESS;
    calculating a heat generation value using the electrical sensor data;
    providing to the processor, pump sensor data indicative of an inlet temperature for the pump, outlet temperature for the pump, speed of the pump, and density of coolant within the pump;
    determining a mass flow rate and coolant specific heat using the pump sensor data;
    providing to the processor, ambient temperature data;
    determining a target temperature for the inlet of the pump using timestamp data, the ambient temperature, and a vehicle mode parameter;
    providing to the processor, temperature sensor data indicative of a measured outlet coolant temperature;
    calculating a required thermal power value using the target temperature, mass flow rate, coolant specific heat, and the measured outlet coolant temperature; and
    calculating a target thermal conditioning value for the RESS using the required thermal power value and the heat generation value wherein the target thermal conditioning value is calculated from the difference between the required thermal power value and the heat generation value to change a power demand to drive a high voltage battery heater to heat the RESS or the target thermal condition value is calculated from the accumulation of the required thermal power value and the heat generation value to change the power demand to an air conditioning compressor to cool the RESS.

2. The method of claim 1, wherein the target thermal conditioning value is used for feed forward control of the RESS.

3. A system for determining a target thermal conditioning value for a rechargeable energy storage system (RESS) for a vehicle having a coolant pump, the system comprising:
    an interface configured to receive electrical sensor data from a current sensor and a resistance sensor connected to the RESS;
    a heat generation calculator configured to calculate a heat generation value using a power-based strategy on the electrical sensor data;
    an interface configured to receive pump sensor data from an inlet temperature for the pump, outlet temperature for the pump, speed of the pump, and density of coolant within the pump;
    a coolant-based engine configured to determine a mass flow rate and coolant specific heat using the pump sensor data;
    an interface configured to receive ambient temperature data from an external sensor to the RESS;
    a temperature-based device configured to determine a target temperature for the inlet of the pump using a temperature-based strategy on the external sensor data;
    an interface configured to receive a measured outlet coolant temperature from a temperature sensor;
    a thermal power evaluator configured to calculate the required thermal power value using the target temperature, the mass flow rate, the coolant specific heat, and the measured outlet coolant temperature; and
    a target thermal conditioning evaluator configured to determine a target thermal conditioning value from the required thermal power value and the heat generation value wherein the target thermal conditioning value is calculated from the difference between the required thermal power value and the heat generation value to change a power demand to drive a high voltage battery heater to heat the RESS or the target thermal condition value is calculated from the accumulation of the required thermal power value and the heat generation value to change the power demand to an air conditioning compressor to cool the RESS.

4. The system of claim 3, wherein the target thermal conditioning value is used for feed forward control of the RESS.

5. A system for controlling the thermal conditioning of a rechargeable energy storage system (RESS) for a vehicle having a coolant pump, the system comprising:
    a current sensor configured to measure a current of the RESS;
    a resistance sensor configured to measure a resistance of the RESS;
    a pump sensor configured to measure an inlet temperature for the pump, outlet temperature for the pump, speed of the pump, and density of coolant within the pump;
    an external sensor to the RESS configured to measure ambient temperature data, timestamp data, and a vehicle mode parameter;
    a temperature sensor configured to measure an outlet coolant temperature; and
    a processor coupled to a memory and configured to:
        receive electrical sensor data indicative of a current and resistance of the RESS;
        determine a heat generation value using the electrical sensor data;
        receive pump sensor data indicative of an inlet temperature for the pump, outlet temperature for the pump, speed of the pump, and density of coolant within the pump;
        determine a mass flow rate and coolant specific heat using the pump sensor data;
        receive ambient temperature data;
        determine a target temperature for the inlet of the pump using the ambient temperature, timestamp data, and a vehicle mode parameter;
        receive temperature sensor data indicative of the measured outlet coolant temperature;
        control the thermal condition of the RESS using a target thermal conditioning value wherein the target thermal conditioning value is calculated from the difference between the required thermal power value and the heat generation value to change a power demand to drive a high voltage battery heater to heat the RESS or the target thermal condition value is calculated from the accumulation of the required thermal power value and the heat generation value to change the power demand to an air conditioning compressor to cool the RESS.

6. The method of claim 5, wherein the target thermal conditioning value is used for feed forward control of the RESS.

7. The system of claim 5, wherein the target thermal conditioning value is stored in the memory.

8. The method of claim 1, further comprising displaying the thermal condition value on a display.

9. The method of claim 8, wherein the display is a meter, a gauge, or text display.

10. The system of claim 3, further comprising displaying the thermal condition value on a display.

11. The system of claim 10, wherein the display is a meter, a gauge, or text display.

12. The system of claim 5, further comprising displaying the thermal condition value on a display.

13. The system of claim 12, wherein the display is a meter, a gauge, or text display.

14. The method of claim 1, wherein the difference and the accumulation are calculated concurrently.

15. The system of claim 5, wherein the difference and the accumulation are calculated concurrently.

16. The system of claim 3, wherein the difference and the accumulation are calculated concurrently.

* * * * *